3,187,007
WATER-SOLUBLE PHTHALOCYANINE DYE-STUFFS CONTAINING SULFONYLETHYL-ENEIMIDE GROUPS

Hans von Tobel, Basel, Switzerland, assignor to Sandoz Ltd., Basel, Switzerland
No Drawing. Filed Dec. 15, 1958, Ser. No. 780,210
Claims priority, application Switzerland, Dec. 23, 1957, 54,071; Nov. 4, 1958, 65,773
6 Claims. (Cl. 260—314.5)

The present invention relates to water-soluble dyestuffs of the phthalocyanine series which contain at least once the reactive group

The process for the production of dyestuffs of this type consists in reacting 1 mode of a phthalocyanine compound containing two or more sulfonic acid chloride groups with at least 1 mole of ethylene imine, the reaction being conducted with at the maximum an amount of ethylene imine which will leave free a number of sulfonic acid chloride groups sufficient to render the dyestuff sufficiently water-soluble on completion of the subsequent hydrolysis.

The phthalocyanine compounds suitable for the process may be metal-free or they may contain a metal as the central atom, e.g., the commonly used copper, nickel and cobalt phthalocyanines. Also, they can be substituted, for example with chlorine atoms or phenyl groups, provided they remain capable of accepting the number of sulfonic acid chloride groups necessary for the process. The introduction of the sulfonic acid chloride groups is effected by the known methods, e.g., with chlorosulfonic acid; the starting materials themselves may already contain sulfonic acid groups.

The sulfonic acid chloride groups are introduced directly on the benzene nucleus in the 3- or 4-position or, alternatively, on external radicals.

The reaction of the phthalocyanine sulfonic acid chlorides with the ethylene imine is conducted preferably in an aqueous medium with the addition of an acid-binding agent. On completion of condensation the reaction mixture is stirred until such time as the superfluous sulfonic acid chloride groups are saponified. To protect the ethylene imine ring which must remain intact for the dyeing process, the reaction is carried out under the mildest possible conditions, that is to say, high temperatures are avoided and the pH value is not permitted to vary appreciably from the neutral point. For instance it is advisable to work at temperatures between —5° and 50° C., preferably between 0° and 15° C., and in the pH-range of 5 to 8. The new dyestuffs are suitable for dyeing, printing and padding fibers of vegetable and animal origin, fibers of regenerated cellulose, animalized cellulose fibers, casein fibers, synthetic polyamide fibers, mixtures of these fibers, and leather. The dyeings obtained on these materials possess very good fastness to light, washing, perspiration, water, sea water, alkali, rubbing, and pressing. The dyestuffs reserve polyester fibers very well.

In the following examples the parts and percentages are by weight and the temperatures are given in degrees centigrade.

Example 1

A moist filter cake, the bulk of which consists of copper phthalocyanine disulfonic acid chloride, produced by sulfochlorination of 57.6 parts of copper phthalocyanine in chlorosulfonic acid at 105–115° and subsequently precipitation on ice, is stirred into a mixture of 200 parts of ice and 200 parts of water. The pH value of the suspension is adjusted to 6.0 with a sodium hydroxide solution. Over the next few minutes 4.3 parts of ethylene imine are dropped into the mass, which is then stirred at 0° with gradual addition of sodium hydroxide to maintain a constant pH of 7.0. As soon as no further sodium hydroxide is consumed, sufficient potassium chloride is added to cause complete precipitation of the reaction product. The dyestuff is filtered off and dried in vacuo at 30–35°. It dyes cotton in turquoise shades which are fast to light and wet treatments.

Example 2

The procedure described in Example 1 is followed, using a moist filter cake containing mainly copper phthalocyanine trisulfonic acid chloride, which is produced by sulfochlorination of 57.6 parts of copper phthalocyanine in chlorosulfonic acid at 120–130° and subsequent precipitation on ice, and 8.6 parts of ethylene imine, but the reaction temperature is maintained at 10°. The new dyestuff dyes cotton and fibers of regenerated cellulose in turquoise shades which are fast to light and to wet treatments.

Example 3

The procedure of Example 1 is followed in most particulars, except that the temperature is held at 15°, the starting material being in this case a filter cake containing copper phthalocyanine tetrasulfonic acid chloride, produced by sulfochlorination of copper phthalocyanine in chlorosulfonic acid at 145–150° and subsequent precipitation on ice, and 8.6 parts of ethylene imine. A dyestuff is obtained which dyes cotton and wool in turquoise shades which are fast to light and wet treatments.

In the following table are listed further dyestuffs containing reactive ethylene imide groups which can be produced according to the procedure described in the foregoing examples.

| Example No. | Phthalocyanine component | Temperature of sulfochlorination | Parts of ethylene imine | Shade on cotton |
|---|---|---|---|---|
| 4 | 61 parts of copper 4-chlorophthalocyanine. | 145–150° | 4.3 | Turquoise. |
| 5 | 89.6 parts of copper phthalocyanine-4.4′4′′.4′′′-tetrasulfonic acid 100%. | 145–150° | 8.6 | Do. |
| 6 | 57.2 parts of cobalt phthalocyanine. | 125–135° | 4.3 | Do. |
| 7 | 57.1 parts of nickel phthalocyanine. | 125–135° | 4.3 | Do. |
| 8 | 73.9 parts of copper 4.4′-diphenyl-phthalocyanine. | 140° | 4.3 | Bluish green. |
| 9 | 88 parts of 4.4′.4′′.4′′′-tetra-phenylphthalocyanine. | [1] 20° | 4.3 | Yellowish green. |

[1] With addition of thionyl chloride.

Example 10

100 parts of a mercerised cotton fabric are impregnated on a padder at room temperature with a solution containing 20 parts of the dyestuff of Example 3 in 1000 parts of water. The fabric is squeezed to give an increase of 70–80% over the dry weight. It is then treated with agitation in a bath of 1000 parts of water, 250 parts of calcined sodium sulfate, 5 parts of sodium 3-nitrobenzene-1-sulfonate and 30 parts of trisodium phosphate or 3 parts of sodium hydroxide for 1 hour at 80–90° to bring about fixation of the dyestuff. After the treatment the fabric is washed in cold and then in hot water, soaped at the boil for 20 minutes, washed again and dried.

A turquoise shade is obtained which has excellent fastness to washing and to light.

Formulae of representative dyestuffs of the foregoing examples are as follows

Example 1:

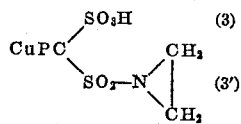

CuPC=Copper phthalocyanine radical

Example 2:

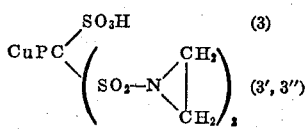

Example 3:

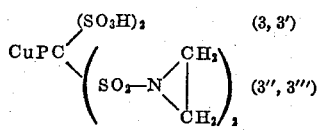

Example 4:

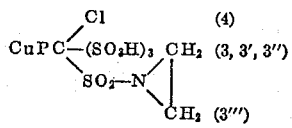

Example 5:

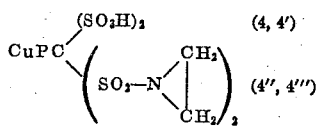

Having thus disclosed the invention what I claim is:

1. A metal phthalocyanine dyestuff, wherein the metal is selected from the group consisting of copper and cobalt, and which dyestuff contains as sole substituents, per molecule, from one to three —$SO_3H$ groups and from one to two

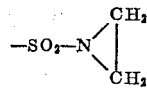

groups; the total number of —$SO_3H$ and

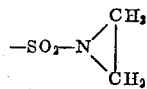

groups being maximally 4.

2. A copper phthalocyanine dyestuff which contains as sole substituents, per molecule, from one to three —$SO_3H$ groups and from one to two

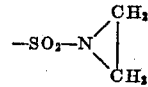

groups; the total number of —$SO_3H$ and

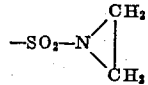

groups being maximally 4.

3. A copper phthalocyanine dyestuff which contains as sole substituents one —$SO_3H$ group and one

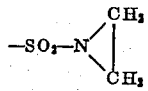

group.

4. A copper phthalocyanine dyestuff which contains as sole substituent one —$SO_3H$ group and two

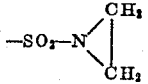

groups.

5. Copper phthalocyanine which contains as sole substituents two —$SO_3H$ groups and two

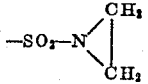

groups.

6. A copper phthalocyanine dyestuff which contains as sole substituents one chlorine atom, three —$SO_3H$ groups and one

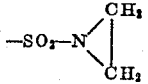

group.

References Cited by the Examiner
UNITED STATES PATENTS

| | | | |
|---|---|---|---|
| 2,459,771 | 1/49 | Fox | 260—314.5 |
| 2,493,724 | 1/50 | Mayhew | 260—314.5 |
| 3,035,043 | 5/62 | Benz et al. | 260—152 |

OTHER REFERENCES

F.I.A.T. Final Report #1313, volume III, page 357.
Fieser et al: "Organic Chemistry," Reinhold, New York (1956), pages 46 and 47.
Hackh's Chemical Dictionary, Blakiston, New York (1937), page 457.
Lubs: Chemistry of Syn. Dyes and Pigments, A.C.S. Monograph #127, page 612, Reinhold Publ. Company, New York (1955).
Wegmann: Textile-Praxis 10/58, pages 1056–1061.

WALTER A. MODANCE, *Primary Examiner.*

IRVING MARCUS, H. J. LIDOFF, *Examiners.*